(12) United States Patent
Kida et al.

(10) Patent No.: US 9,034,940 B2
(45) Date of Patent: May 19, 2015

(54) ULTRAVIOLET-CURABLE INK JET INK COMPOSITION

(71) Applicant: Seiko Epson Corporation, Tokyo (JP)

(72) Inventors: Hiroaki Kida, Shiojiri (JP); Chigusa Sato, Shiojiri (JP); Hiroyuki Kajimoto, Matsumoto (JP); Toru Saito, Yamagata (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/155,588

(22) Filed: Jan. 15, 2014

(65) Prior Publication Data

US 2014/0128496 A1    May 8, 2014

Related U.S. Application Data

(62) Division of application No. 13/234,666, filed on Sep. 16, 2011.

(30) Foreign Application Priority Data

Sep. 30, 2010  (JP) ................................. 2010-221089
May 17, 2011  (JP) ................................. 2011-110100

(51) Int. Cl.
| | | |
|---|---|---|
| *C09D 11/38* | (2014.01) | |
| *C09D 11/30* | (2014.01) | |
| *C09D 11/101* | (2014.01) | |
| *C09D 11/322* | (2014.01) | |

(52) U.S. Cl.
CPC .............. *C09D 11/30* (2013.01); *C09D 11/101* (2013.01); *C09D 11/322* (2013.01)

(58) Field of Classification Search
CPC ........ C09D 11/30; C09D 11/02; C09D 11/06; C09D 11/10; C09D 11/101; C09D 11/106; C09D 11/322; C09D 121/38
USPC ............... 522/25, 26, 31, 75, 81, 84, 79, 170, 522/182, 181; 427/466; 106/31.13, 31.24, 106/20 B; 523/160, 161
See application file for complete search history.

(56) References Cited

U.S. PATENT DOCUMENTS

| | | | |
|---|---|---|---|
| 2,692,256 A | 10/1954 | Bauer et al. | |
| 4,303,924 A | 12/1981 | Young, Jr. | |
| 4,577,205 A | 3/1986 | Shibata et al. | |
| 5,266,106 A | 11/1993 | Breton | |
| 5,275,646 A | 1/1994 | Marshall et al. | |
| 5,596,027 A | 1/1997 | Mead et al. | |
| 5,641,346 A | 6/1997 | Mantell et al. | |
| 5,889,084 A | 3/1999 | Roth | |
| 5,897,695 A | 4/1999 | Mayo et al. | |
| 6,187,897 B1 | 2/2001 | Kawashima et al. | |
| 6,310,115 B1 * | 10/2001 | Vanmaele et al. | 522/25 |
| 8,227,047 B2 * | 7/2012 | Loccufier et al. | 427/466 |
| 2009/0000508 A1 * | 1/2009 | Edison et al. | 106/31.6 |
| 2009/0099277 A1 * | 4/2009 | Nagvekar et al. | 522/153 |
| 2010/0330296 A1 * | 12/2010 | Loccufier et al. | 427/511 |
| 2011/0091790 A1 * | 4/2011 | Barnwell et al. | 429/483 |
| 2012/0113201 A1 | 5/2012 | Kagose et al. | |
| 2012/0140005 A1 * | 6/2012 | De Voeght et al. | 347/93 |
| 2012/0274717 A1 | 11/2012 | Nakano et al. | |
| 2013/0010039 A1 | 1/2013 | Kida et al. | |
| 2013/0250019 A1 | 9/2013 | Sato et al. | |

FOREIGN PATENT DOCUMENTS

| | | |
|---|---|---|
| EP | 997508 A1 * | 5/2000 |
| EP | 997508 A1 | 5/2000 |
| JP | 2004067991 A * | 3/2004 |
| JP | 2004067991 A | 3/2004 |
| JP | 2005-214395 A | 8/2005 |
| JP | 2008-507598 A | 3/2008 |
| JP | 2008-280383 A | 11/2008 |
| WO | WO-2006-085992 A2 | 8/2006 |
| WO | WO-2010-069758 A1 | 6/2010 |

OTHER PUBLICATIONS

Coatings that stay looking good: BASF performance additive. BASF Product Guide. [online], [retrieved on Jun. 26, 2014]. Retrieved from internet <URL: http://www.basf.com/group/corporate/us/en/literature-document:/Brand+Chimassorb-Brochure--Coatings+that+stay+looking+good+BASF+performance+additives-English.pdf>.*
Keskin et al. 2-Mercaptothioxanthone as Sensitizers and Coinitiators for Acylphosphine Oxide Photoinitiators for Free Radical Polymerization. Macromolecules, 2008, 41(13), 4631-4634.

* cited by examiner

*Primary Examiner* — Sanza McClendon
(74) *Attorney, Agent, or Firm* — Harness, Dickey & Pierce, P.L.C.

(57) ABSTRACT

Provided is an ultraviolet-curable ink jet ink composition with excellent curability and storage stability, the composition containing a monomer A represented by Formula (I): $CH_2=CR^1-COOR^2-O-CH=CH-R^3$ (wherein $R^1$ represents a hydrogen atom or a methyl group, $R^2$ represents a $C_2$-$C_{20}$ divalent organic residue, and $R^3$ represents a hydrogen atom or a $C_1$-$C_{11}$ monovalent organic residue); a (meth)acrylated amine compound; a hindered amine compound other than the (meth)acrylated amine compound; and a photopolymerization initiator.

10 Claims, No Drawings

ULTRAVIOLET-CURABLE INK JET INK COMPOSITION

CROSS-REFERENCE TO RELATED APPLICATIONS

This is a divisional patent application of U.S. application Ser. No. 13/234,666 filed Sep. 16, 2011 which claims priority to Japanese Patent Application Nos. 2010-221089 filed Sep. 30, 2010 and 2011-110100 filed May 17, 2011 all of which are incorporated by reference in their entireties.

BACKGROUND

1. Technical Field

The present invention relates to an ultraviolet-curable ink jet ink composition.

2. Related Art

A variety of recording systems have been used as an image recording method for forming an image on a recording medium such as paper based on image data signals. Among these, an ink jet system uses an inexpensive apparatus and forms an image directly on a recording medium by ejecting an ink only on a required image area, thus achieving efficient use of an ink and low running costs. Further, the ink jet system is excellent as an image recording system due to less generation of noise.

In order to form printing having high water resistance, solvent resistance and scratch resistance, and the like on the surface of a recording medium, an ultraviolet-curable ink jet ink composition that is curable by irradiation of ultraviolet radiation has recently been used in an ink jet recording method.

For example, JP-A-2008-280383 discloses an ultraviolet-curable ink jet ink composition containing 2-(2-vinyloxyethoxy)ethyl acrylate, tripropylene glycol diacrylate, an aminoacrylate-based acrylic resin, and a photopolymerization initiator.

However, the ink composition disclosed in JP-A-2008-280383 leaves some room for improvements in terms of curability and storage stability.

SUMMARY

Therefore, an advantage of some aspects of the invention is that an ultraviolet-curable ink jet ink composition with excellent curability and storage stability is provided.

As a result of a variety of extensive and intensive studies to address the problems as described above, the inventors of the present invention have discovered that the foregoing problems may be addressed by an ultraviolet-curable ink jet ink composition containing a certain monomer, a (meth)acrylated amine compound, a hindered amine compound other than the (meth)acrylated amine compound, and a photopolymerization initiator. The present invention has been completed based on these findings.

That is, the present invention is as follows.

[1] According to an aspect of the invention, there is provided an ultraviolet-curable ink jet ink composition containing: a monomer A represented by Formula (I):

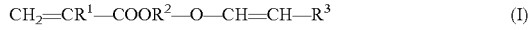
$$CH_2=CR^1-COOR^2-O-CH=CH-R^3 \quad (I)$$

(wherein $R^1$ represents a hydrogen atom or a methyl group, $R^2$ represents a $C_2$-$C_{20}$ divalent organic residue, and $R^3$ represents a hydrogen atom or a $C_1$-$C_{11}$ monovalent organic residue); a (meth)acrylated amine compound; a hindered amine compound other than the (meth)acrylated amine compound; and a photopolymerization initiator.

[2] It is preferable that the monomer A is 2-(vinyloxyethoxy)ethyl (meth)acrylate.

[3] It is preferable that the content of the monomer A is in a range of 10 to 80% by mass, based on the total mass of the ink composition.

[4] It is preferable that the (meth)acrylated amine compound has one or two photopolymerizable functional groups and one or two amino groups in the molecule thereof.

[5] It is preferable that the content of the (meth)acrylated amine compound is in a range of 0.5 to 30% by mass, based on the total mass of the ink composition.

[6] It is preferable that the hindered amine compound is a compound having a 2,2,6,6-tetramethylpiperidinyl-N-oxyl group.

[7] It is preferable that the content of the compound having a 2,2,6,6-tetramethylpiperidinyl-N-oxyl group is in a range of 0.05 to 3% by mass, based on the total mass of the ink composition.

[8] It is preferable that the ultraviolet-curable ink jet ink composition further contains 5 to 40% by mass of phenoxyethyl(meth)acrylate, based on the total mass of the ink composition.

[9] It is preferable that the photopolymerization initiator contains 7% by mass or more of an acylphosphine oxide compound and 0.5% by mass or more of a thioxanthone compound, based on the total mass of the ink composition.

[10] It is preferable that the ultraviolet-curable ink jet ink composition is curable by irradiating ultraviolet radiation with an emission peak wavelength ranging from 350 to 420 nm, at an irradiation energy of 300 mJ/cm$^2$ or less.

[11] It is preferable that the ultraviolet-curable ink jet ink composition is curable to a thin film having a thickness of 0.5 to 3 μm.

DESCRIPTION OF EXEMPLARY EMBODIMENTS

Now, exemplary embodiments for carrying out the invention will be described in more detail. This invention, however, should not be construed as being limited to the embodiments set forth herein. Those skilled in the art will appreciate that various modifications are possible without departing from the scope and spirit of the invention as disclosed in the accompanying claims.

As used herein, the term "(meth)acrylate" refers to at least one of an acrylate and a methacrylate corresponding thereto, and the term "(meth)acryl" refers to at least one of an acryl and a methacryl corresponding thereto.

As used herein, the term "curability" refers to a property of undergoing polymerization-curing by irradiation of light in the presence or absence of a photopolymerization initiator. The term "storage stability" refers to a property of a viscosity of an ink before and after storage thereof being not readily changed, when the ink is stored at 60° C. for 7 days.

Ultraviolet-Curable Ink Jet Ink Composition

An exemplary embodiment of the invention is directed to an ultraviolet-curable ink jet ink composition. The ultraviolet-curable ink jet ink composition contains: a vinyl ether group-containing (meth)acrylic acid ester (hereinafter, referred to as "monomer A") represented by Formula (I):

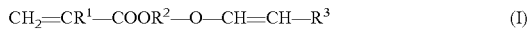
$$CH_2=CR^1-COOR^2-O-CH=CH-R^3 \quad (I)$$

(wherein $R^1$ represents a hydrogen atom or a methyl group, $R^2$ represents a $C_2$-$C_{20}$ divalent organic residue, and $R^3$ represents a hydrogen atom or a $C_1$-$C_{11}$ monovalent organic residue); a (meth)acrylated amine compound; a hindered amine compound other than the (meth)acrylated amine compound; and a photopolymerization initiator.

Hereinafter, additives (components) will be described which are incorporated or may be incorporated in the ultraviolet-curable ink jet ink composition of the present exemplary embodiment (hereinafter, also referred to simply as "ink composition").

Polymerizable Compound

The polymerizable compound incorporated in the ink composition of the present exemplary embodiment is polymerized upon irradiation of light by the action of a photopolymerization initiator to be described hereinafter, and thus cures a printed ink.

Monomer A

Monomer A, which is an essential polymerizable compound in the present exemplary embodiment, is represented by Formula (I) as above.

The incorporation of monomer A in the ink composition results in adequate curability of an ink.

In Formula (I), the divalent organic residue represented by $R^2$ is preferably a $C_2$-$C_{20}$ linear, branched or cyclic alkylene group, a $C_2$-$C_{20}$ alkylene group having an oxygen atom due to an ether bond and/or an ester bond in the structure, or a $C_6$-$C_{11}$ divalent aromatic group which may be substituted. Among these, $C_2$-$C_6$ alkylene groups such as an ethylene group, an n-propylene group, an isopropylene group and a butylene group; or $C_2$-$C_9$ alkylene groups having an ether bond-derived oxygen atom in the structure, such as an oxyethylene group, an oxy-n-propylene group, an oxyisopropylene group and an oxybutylene group, are preferably used.

In Formula (I), the $C_1$-$C_{11}$ monovalent organic residue represented by $R^3$ is preferably a $C_1$-$C_{10}$ linear, branched or cyclic alkyl group, or a $C_6$-$C_{11}$ aromatic group which may be substituted. Among these, a $C_1$-$C_2$ alkyl group, such as a methyl group or an ethyl group, or a $C_6$-$C_8$ aromatic group, such as a phenyl group or a benzyl group, is preferably used.

When the organic residue is a group which may be substituted, the substituent may be divided into a group containing carbon atom(s) and a group containing no carbon atom(s). When the substituent is a group containing carbon atom(s), the carbon atom(s) are counted in the number of carbon atoms of the organic residue. Examples of the carbon atom-containing group include, but are not limited to, a carboxyl group and an alkoxy group. Examples of the group containing no carbon atom(s) include, but are not limited to, a hydroxyl group and a halo group.

Specific examples of the vinyl ether group-containing (meth)acrylic acid esters represented by Formula (I) include, but are not limited to, 2-vinyloxyethyl(meth)acrylate, 3-vinyloxypropyl(meth)acrylate, 1-methyl-2-vinyloxyethyl (meth)acrylate, 2-vinyloxypropyl(meth)acrylate, 4-vinyloxybutyl(meth)acrylate, 1-methyl-3-vinyloxypropyl(meth) acrylate, 1-vinyloxymethylpropyl(meth)acrylate, 2-methyl-3-vinyloxypropyl(meth)acrylate, 1,1-dimethyl-2-vinyloxyethyl(meth)acrylate, 3-vinyloxybutyl(meth) acrylate, 1-methyl-2-vinyloxypropyl(meth)acrylate, 2-vinyloxybutyl(meth)acrylate, 4-vinyloxycyclohexyl (meth)acrylate, 6-vinyloxyhexyl(meth)acrylate, 4-vinyloxymethylcyclohexylmethyl(meth)acrylate, 3-vinyloxymethylcyclohexylmethyl(meth)acrylate, 2-vinyloxymethylcyclohexylmethyl(meth)acrylate, p-vinyloxymethylphenylmethyl(meth)acrylate, m-vinyloxymethylphenylmethyl(meth)acrylate, o-vinyloxymethylphenylmethyl(meth)acrylate, 2-(vinyloxyethoxy)ethyl(meth) acrylate, 2-(vinyloxyisopropoxy)ethyl(meth)acrylate, 2-(vinyloxyethoxy)propyl(meth)acrylate, 2-(vinyloxyethoxy)isopropyl(meth)acrylate, 2-(vinyloxyisopropoxy) propyl(meth)acrylate, 2-(vinyloxyisopropoxy)isopropyl (meth)acrylate, 2-(vinyloxyethoxyethoxy)ethyl(meth) acrylate, 2-(vinyloxyethoxyisopropoxy)ethyl(meth)acrylate, 2-(vinyloxyisopropoxyethoxy)ethyl(meth)acrylate, 2-(vinyloxyisopropoxyisopropoxy)ethyl(meth)acrylate, 2-(vinyloxyethoxyethoxy)propyl(meth)acrylate, 2-(vinyloxyethoxyisopropoxy)propyl(meth)acrylate, 2-(vinyloxyisopropoxyethoxy)propyl(meth)acrylate, 2-(vinyloxyisopropoxyisopropoxy)propyl(meth)acrylate, 2-(vinyloxyethoxyethoxy)isopropyl(meth)acrylate, 2-(vinyloxyethoxyisopropoxy)isopropyl(meth)acrylate, 2-(vinyloxyisopropoxyethoxy)isopropyl(meth)acrylate, 2-(vinyloxyisopropoxyisopropoxy)isopropyl(meth)acrylate, 2-(vinyloxyethoxyethoxyethoxy)ethyl(meth)acrylate, 2-(vinyloxyethoxyethoxyethoxyethoxy)ethyl(meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether(meth)acrylate, and polypropylene glycol monovinyl ether(meth)acrylate.

Among these, 2-vinyloxyethyl(meth)acrylate, 3-vinyloxypropyl(meth)acrylate, 1-methyl-2-vinyloxyethyl(meth) acrylate, 2-vinyloxypropyl(meth)acrylate, 4-vinyloxybutyl (meth)acrylate, 4-vinyloxycyclohexyl(meth)acrylate, 5-vinyloxypentyl(meth)acrylate, 6-vinyloxyhexyl(meth) acrylate, 4-vinyloxymethylcyclohexylmethyl(meth)acrylate, p-vinyloxymethylphenylmethyl(meth)acrylate, 2-(vinyloxyethoxy)ethyl (meth)acrylate, 2-(vinyloxyethoxyethoxy)ethyl (meth)acrylate, or 2-(vinyloxyethoxyethoxy)ethyl (meth)acrylate is preferable.

Among these, from the viewpoint of a low viscosity, a high flash point, and excellent curability, 2-(vinyloxyethoxy)ethyl (meth)acrylate is more preferable, and 2-(vinyloxyethoxy) ethyl acrylate is still more preferable. Examples of 2-(vinyloxyethoxy)ethyl (meth)acrylate include 2-(2-vinyloxyethoxy)ethyl (meth)acrylate and 2-(1-vinyloxyethoxy)ethyl (meth)acrylate. Examples of 2-(vinyloxyethoxy)ethyl acrylate include 2-(2-vinyloxyethoxy)ethyl acrylate and 2-(1-vinyloxyethoxy)ethyl acrylate.

The content of monomer A is preferably in a range of 10 to 80% by mass based on the total mass (100% by mass) of the ink composition, more preferably 40 to 80% by mass, still more preferably 50 to 80% by mass, and particularly preferably 65 to 80% by mass. If the content of monomer A is within the above-specified range, this particularly leads to satisfactory curability of an ink.

Examples of the production method of the vinyl ether group-containing (meth)acrylic acid esters represented by Formula (I) include, but are not limited to, esterification of (meth)acrylic acid and hydroxyl group-containing vinyl ethers (production method B), esterification of (meth)acrylic acid halide and hydroxyl group-containing vinyl ethers (production method C), esterification of (meth)acrylic acid anhydride and hydroxyl group-containing vinyl ethers (production method D), transesterification of (meth)acrylic acid esters and hydroxyl group-containing vinyl ethers (production method E), esterification of (meth)acrylic acid and halogen-containing vinyl ethers (production method F), esterification of alkali (alkaline-earth) metal salt of (meth)acrylic acid and halogen-containing vinyl ethers (production method G), vinyl exchange between hydroxyl group-containing (meth) acrylic acid esters and vinyl carboxylate (production method H), and transetherification of hydroxyl group-containing (meth)acrylic acid esters and alkyl vinyl ethers (production method I).

Among these, production method E is preferable from the viewpoint of being capable of further exhibiting desired effects of the present exemplary embodiment.

(Meth)Acrylated Amine Compound

The (meth)acrylated amine compound which is an essential polymerizable compound in the present exemplary embodiment can be said in other words to be an amino(meth)acrylate compound. Incorporation of the (meth)acrylated amine compound in the ink composition of the present exemplary embodiment leads to satisfactory curability of an ink.

The (meth)acrylated amine compound is a compound having one or more amino groups and one or more (meth)acryloyl groups. Examples of the (meth)acrylated amine compound preferably include, but are not limited to, (meth)acrylated amine compounds obtained by reacting at least one of monofunctional (meth)acrylate, difunctional (meth)acrylate, trifunctional (meth)acrylate, tetrafunctional (meth)acrylate, pentafunctional (meth)acrylate, and hexafunctional (meth)acrylate with an amine compound.

Examples of monofunctional (meth)acrylate include hexyl (meth)acrylate, 2-ethylhexyl(meth)acrylate, tert-octyl(meth)acrylate, isoamyl(meth)acrylate, decyl(meth)acrylate, isodecyl(meth)acrylate, stearyl(meth)acrylate, isostearyl(meth)acrylate, cyclohexyl(meth)acrylate, 4-n-butylcyclohexyl(meth)acrylate, bornyl(meth)acrylate, isobornyl(meth) acrylate, benzyl(meth)acrylate, 2-ethylhexyl diglycol (meth)acrylate, butoxyethyl(meth)acrylate, 2-chloroethyl(meth)acrylate, 4-bromobutyl(meth)acrylate, cyanoethyl(meth)acrylate, benzyl(meth)acrylate, butoxymethyl(meth)acrylate, 3-methoxybutyl(meth)acrylate, alkoxymethyl(meth)acrylate, alkoxyethyl(meth)acrylate, 2-(2-methoxyethoxy)ethyl(meth)acrylate, 2-(2-butoxyethoxy)ethyl (meth)acrylate, 2,2,2-tetrafluoroethyl(meth)acrylate, 1H,1H,2H,2H-perfluorodecyl(meth)acrylate, 4-butylphenyl (meth)acrylate, phenyl (meth)acrylate, 2,4,5-tetramethylphenyl(meth)acrylate, 4-chlorophenyl(meth)acrylate, phenoxymethyl(meth)acrylate, phenoxyethyl(meth)acrylate, glycidyl(meth)acrylate, glycidyloxybutyl(meth)acrylate, glycidyloxyethyl(meth)acrylate, glycidyloxypropyl(meth)acrylate, tetrahydrofurfuryl(meth)acrylate, hydroxyalkyl (meth)acrylate, 2-hydroxyethyl(meth)acrylate, 3-hydroxypropyl(meth)acrylate, 2-hydroxypropyl(meth)acrylate, 2-hydroxybutyl(meth)acrylate, 4-hydroxybutyl(meth)acrylate, 3-hydroxypropyl(meth)acrylate, dimethylaminoethyl (meth)acrylate, diethylaminoethyl(meth)acrylate, dimethylaminopropyl(meth)acrylate, diethylaminopropyl(meth)acrylate, trimethoxysilylpropyl(meth)acrylate, trimethylsilylpropyl(meth)acrylate, polyethylene oxide monomethyl ether(meth)acrylate, oligoethylene oxide monomethyl ether(meth)acrylate, polyethylene oxide(meth)acrylate, oligoethylene oxide(meth)acrylate, oligoethylene oxide monoalkyl ether(meth)acrylate, polyethylene oxide monoalkyl ether(meth)acrylate, dipropylene glycol(meth)acrylate, polypropylene oxide monoalkyl ether(meth)acrylate, oligopropylene oxide monoalkyl ether(meth)acrylate, 2-methacryloyloxy succinic acid, 2-methacryloyloxyhexahydrophthalic acid, 2-methacryloyloxyethyl-2-hydroxypropylphthalate, methoxypolyethylene glycol methacrylate, methoxypolyethylene glycol acrylate (for example, available from Shin-Nakamura Chemical Co., Ltd.), butoxydiethylene glycol(meth)acrylate, trifluoroethyl(meth)acrylate, perfluorooctyl ethyl (meth)acrylate, 2-hydroxy-3-phenoxypropyl(meth)acrylate, EO-modified phenol(meth)acrylate, EO-modified cresol(meth)acrylate, EO-modified nonylphenol(meth)acrylate, PO-modified nonylphenol (meth)acrylate, and EO-modified-2-ethylhexyl(meth)acrylate.

Specific examples of difunctional (meth)acrylate include 1,6-hexanediol di(meth)acrylate, 1,10-decanediol di(meth)acrylate, neopentyl glycol di(meth)acrylate, 2,4-dimethyl-1,5-pentanediol di(meth)acrylate, butylethylpropanediol (meth)acrylate, ethoxylated cyclohexane methanol di(meth)acrylate, polyethylene glycol di(meth)acrylate, oligoethylene glycol di(meth)acrylate, ethylene glycol di(meth)acrylate, 2-ethyl-2-butylbutanediol di(meth)acrylate, hydroxypivalic acid neopentyl glycol di(meth)acrylate, EO-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, and tricyclodecane di(meth)acrylate.

Specific examples of trifunctional (meth)acrylate include trimethylolpropane tri(meth)acrylate, trimethylolethane tri(meth)acrylate, alkylene oxide-modified trimethylolpropane tri(meth)acrylate, pentaerythritol tri(meth)acrylate, dipentaerythritol tri(meth)acrylate, trimethylol propane tri((meth)acryloyloxypropyl)ether, isocyanuric acid alkylene oxide-modified tri(meth)acrylate, propionic acid dipentaerythritol tri(meth)acrylate, tri((meth)acryloyloxyethyl) isocyanurate, hydroxypivalaldehyde-modified dimethylolpropane tri(meth)acrylate, sorbitol tri(meth)acrylate, propoxylated trimethylolpropane tri(meth)acrylate, and ethoxylated glycerin triacrylate.

Specific examples of tetrafunctional (meth)acrylate include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Specific examples of pentafunctional (meth)acrylate include sorbitol penta(meth)acrylate, and dipentaerythritol penta(meth)acrylate.

Specific examples of hexafunctional (meth)acrylate include dipentaerythritol hexa(meth)acrylate, sorbitol hexa(meth)acrylate, alkylene oxide-modified hexa(meth)acrylate of phosphagene, and caprolactone pentaerythritol hexa(meth)acrylate.

Examples of the amine compound include, but are not limited to, monofunctional amine compounds such as benzylamine, phenethylamine, ethylamine, n-propylamine, isopropylamine, n-butylamine, isobutylamine, n-pentylamine, isopentylamine, n-hexylamine, cyclohexylamine, n-heptylamine, n-octylamine, 2-ethylhexylamine, n-nonylamine, n-decylamine, n-dodecylamine, n-tetradecylamine, n-hexadecylamine, and n-octadecylamine; and polyfunctional amine compounds such as diethylenetriamine, triethylenetetramine, tetraethylenepentamine, 1,6-hexamethylenediamine, 1,8-octamethylenediamine, 1,12-dodecamethylenediamine, o-phenylenediamine, p-phenylenediamine, m-phenylenediamine, o-xylenediamine, p-xylenediamine, m-xylenediamine, menthanediamine, bis(4-amino-3-methylcyclohexylmethane, isophoronediamine, 1,3-diaminocyclohexane, and spiroacetal diamine. Other examples of the amine compound include high-molecular weight polyfunctional amine compounds such as polyethyleneimine, polyvinyl amine, and polyallyl amine.

Examples of commercially available products of the (meth)acrylated amine compound include CN371 (trade name, a compound containing two amino groups and two acryloyl groups, manufactured by Sartomer Co.), EBECRYL 7100 (trade name, a compound containing two amino groups and two acryloyl groups, manufactured by Cytech, Inc.), CN386 (a compound containing two amino groups and one acryloyl group), CN372 (a compound containing one amino group and one acryloyl group), CN373 (a compound containing one amino group and two acryloyl groups), CN383 (a compound containing one amino group and one acryloyl group), and CN374 (a compound containing two amino groups and one acryloyl group) (all trade names, manufactured by Sartomer Co.).

Among these, the (meth)acrylated amine compound preferably has one or two photopolymerizable functional groups and one or two amino groups in the molecule thereof, and more preferably two photopolymerizable functional groups and two amino groups in the molecule thereof, particularly for the purpose of achieving satisfactory curability of an ink. As used herein, the term "photopolymerizable functional group" refers to a functional group which is polymerizable by irradiation of light, and consists of a (meth)acryloyl group or consists of a (meth)acryloyl group and a photopolymerizable functional group other than the (meth)acryloyl group. Specific examples of the photopolymerizable functional group other than the (meth)acryloyl group include cationic groups, e.g. cyclic ether groups such as an epoxy group, anionic groups, and those having an ethylenic double bond such as a vinyl group or an allyl group. Among these, for the purpose of more effective and reliable achievement of effects of the present exemplary embodiment, the photopolymerizable functional group preferably consists of a (meth)acryloyl group.

In other words, the (meth)acrylated amine compound is preferably a (meth)acrylated amine compound obtained by reacting monofunctional and difunctional (meth)acrylates with an amine compound.

Examples of the monofunctional (meth)acrylate include hexyl(meth)acrylate, 2-ethylhexyl(meth)acrylate, tert-octyl(meth)acrylate, isoamyl(meth)acrylate, decyl(meth)acrylate, isodecyl(meth)acrylate, stearyl(meth)acrylate, isostearyl(meth)acrylate, cyclohexyl(meth)acrylate, 4-n-butylcyclohexyl(meth)acrylate, bornyl(meth)acrylate, isobornyl(meth)acrylate, benzyl(meth)acrylate, 2-ethylhexyl diglycol (meth)acrylate, butoxyethyl(meth)acrylate, 2-chloroethyl(meth)acrylate, 4-bromobutyl(meth)acrylate, cyanoethyl(meth)acrylate, benzyl(meth)acrylate, butoxymethyl(meth)acrylate, 3-methoxybutyl(meth)acrylate, alkoxymethyl(meth)acrylate, alkoxyethyl(meth)acrylate, 2-(2-methoxyethoxy)ethyl (meth)acrylate, 2-(2-butoxyethoxy)ethyl (meth)acrylate, 2,2,2-tetrafluoroethyl(meth)acrylate, 1H,1H,2H,2H-perfluorodecyl(meth)acrylate, 4-butylphenyl(meth)acrylate, phenyl(meth)acrylate, 2,4,5-tetramethylphenyl(meth)acrylate, 4-chlorophenyl(meth)acrylate, phenoxymethyl(meth)acrylate, phenoxyethyl(meth)acrylate, glycidyl(meth)acrylate, glycidyloxybutyl(meth)acrylate, glycidyloxyethyl(meth)acrylate, glycidyloxypropyl(meth)acrylate, tetrahydrofurfuryl(meth)acrylate, hydroxyalkyl(meth)acrylate, 2-hydroxyethyl(meth)acrylate, 3-hydroxypropyl(meth)acrylate, 2-hydroxypropyl(meth)acrylate, 2-hydroxybutyl(meth)acrylate, 4-hydroxybutyl(meth)acrylate, 3-hydroxypropyl(meth)acrylate, dimethylaminoethyl(meth)acrylate, diethylaminoethyl(meth)acrylate, dimethylaminopropyl(meth)acrylate, diethylaminopropyl(meth)acrylate, trimethoxysilylpropyl(meth)acrylate, trimethylsilylpropyl(meth)acrylate, polyethylene oxide monomethyl ether(meth)acrylate, oligoethylene oxide monomethyl ether(meth)acrylate, polyethylene oxide (meth)acrylate, oligoethylene oxide(meth)acrylate, oligoethylene oxide monoalkyl ether(meth)acrylate, polyethylene oxide monoalkyl ether(meth)acrylate, dipropylene glycol(meth)acrylate, polypropylene oxide monoalkyl ether(meth)acrylate, oligopropylene oxide monoalkyl ether(meth)acrylate, 2-methacryloyloxy succinic acid, 2-methacryloyloxyhexahydrophthalic acid, 2-methacryloyloxyethyl-2-hydroxypropylphthalate, methoxypolyethylene glycol methacrylate, methoxypolyethylene glycol acrylate (for example, available from Shin-Nakamura Chemical co., Ltd.), butoxydiethylene glycol(meth)acrylate, trifluoroethyl(meth)acrylate, perfluorooctyl ethyl(meth)acrylate, 2-hydroxy-3-phenoxypropyl(meth)acrylate, EO-modified phenol(meth)acrylate, EO-modified cresol(meth)acrylate, EO-modified nonylphenol(meth)acrylate, PO-modified nonylphenol(meth)acrylate, and EO-modified-2-ethylhexyl(meth)acrylate.

Examples of the difunctional (meth)acrylate include, but are not limited to, alkylene glycol di(meth)acrylates such as 1,4-butanediol di(meth)acrylate, 1,6-hexanediol di(meth)acrylate, 1,9-nonanediol di(meth)acrylate, propylene glycol di(meth)acrylate, 1,3-butylene glycol di(meth)acrylate, and neopentyl glycol di(meth)acrylate; bisphenol alkylene oxide adduct di(meth)acrylates such as di(meth)acrylate of an EO (ethylene oxide) adduct of bisphenol A, di(meth)acrylate of an ethylene oxide adduct of bisphenol F, di(meth)acrylate of an ethylene oxide adduct of bisphenol S, di(meth)acrylate of an ethylene oxide adduct of thiobisphenol, and di(meth)acrylate of an ethylene oxide adduct of brominated bisphenol A; polyalkylene glycol di(meth)acrylates such as polyethylene glycol di(meth)acrylate, and polypropylene glycol di(meth)acrylate; and di(meth)acrylate of hydroxypivalic acid neopentyl glycol ester. Among these, 1,6-hexanediol di(meth)acrylate is preferable.

Examples of the amine compound include, but are not limited to, monofunctional amine compounds such as benzylamine, phenethylamine, ethylamine, n-propylamine, isopropylamine, n-butylamine, isobutylamine, n-pentylamine, isopentylamine, n-hexylamine, cyclohexylamine, n-heptylamine, n-octylamine, 2-ethylhexylamine, n-nonylamine, n-decylamine, n-dodecylamine, n-tetradecylamine, n-hexadecylamine, and n-octadecylamine; and polyfunctional amine compounds such as diethylenetriamine, triethylenetetramine, tetraethylenepentamine, 1,6-hexamethylenediamine, 1,8-octamethylenediamine, 1,12-dodecamethylenediamine, o-phenylenediamine, p-phenylenediamine, m-phenylenediamine, o-xylenediamine, p-xylenediamine, m-xylenediamine, menthanediamine, bis(4-amino-3-methylcyclohexylmethane, isophoronediamine, 1,3-diaminocyclohexane, and spiroacetal diamine. Other examples of the amine compound include high-molecular weight polyfunctional amine compounds such as polyethyleneimine, polyvinyl amine, and polyallyl amine.

As a preferable (meth)acrylated amine compound, a compound obtained by reacting 1,6-hexanediol di(meth)acrylate and an amine compound is preferably used. Examples of commercially available products of such a compound include CN371 (manufactured by Sartomer Co.) and EBECRYL 7100 (manufactured by Cytech, Inc.).

The (meth)acrylated amine compounds may be used alone or in a combination of two or more thereof.

The content of the (meth)acrylated amine compound is preferably in a range of 0.5 to 30% by mass based on the total mass (100% by mass) of the ink composition, and more preferably 1 to 20% by mass. If the content of the (meth)acrylated amine compound is within the above-specified range, this particularly leads to satisfactory curability of an ink.

Hindered Amine Compound

In the present specification, the hindered amine compound which is an essential polymerizable compound in the present exemplary embodiment refers to a compound excluding the foregoing (meth)acrylated amine compound. Incorporation of the hindered amine compound in the ink composition of the present exemplary embodiment gives capability for achieving satisfactory storage stability of an ink.

Examples of the hindered amine compound include, but are not limited to, a compound having a 2,2,6,6-tetramethylpiperidinyl-N-oxyl radical, a compound having a 2,2,6,6-tetramethylpiperidinyl group, a compound having a 2,2,6,6-tetramethylpiperidinyl-N-alkyl group, and a compound having a 2,2,6,6-tetramethylpiperidinyl-N-acyl group.

Examples of commercially available products of the hindered amine compound include ADK STAB LA-7 RD (2,2,6,6-tetramethyl-4-hydroxypiperidine-1-oxyl) (trade name, manufactured by ADEKA), IRGASTAB UV 10 (4,4'-[1,10-dioxo-1,10-decanediyl)bis(oxy)]bis[2,2,6,6-tetramethyl]-1-piperidinyloxy) (CAS. 2516-92-9), TINUVIN 123 (4-hydroxy-2,2,6,6-tetramethylpiperidine-N-oxyl) (CAS. 2226-96-2) (all trade names, manufactured by Ciba Japan K.K.), FA-712HM (trade name, tetramethylpiperidinyl-methacrylate, manufactured by Hitachi Chemical Company, Ltd.) (CAS. 31582-45-3), TINUVIN 111 FDL, TINUVIN 144, TINUVIN 152, TINUVIN 292, TINUVIN 765, TINUVIN 770 DF, TINUVIN 5100, SANOLLS-2626, CHIMASSORB 119 FL, CHIMASSORB 2020 FDL, CHIMASSORB 944 FDL, TINUVIN 622 LD (all trade names, manufactured by Ciba Japan K.K.), LA-52, LA-57, LA-62, LA-63 P, LA-68 LD, LA-77 Y, LA-77 G, LA-81, LA-82, LA-87 (all trade names, manufactured by ADEKA), and FA-711HM (trade name, manufactured by Hitachi Chemical Company, Ltd.).

Among these, a compound having a 2,2,6,6-tetramethylpiperidinyl-N-oxyl radical is preferable, and a compound having a 2,2,6,6-tetramethylpiperidinyl-N-oxyl radical is more preferable. In this case, satisfactory storage stability of an ink can be secured while maintaining curability.

Specific examples of the compound having a 2,2,6,6-tetramethylpiperidinyl-N-oxyl radical include, but are not limited to, 2,2,6,6-tetramethyl-4-hydroxypiperidine-1-oxyl, 4,4'-[1,10-dioxo-1,10-decanediyl)bis(oxy)]bis[2,2,6,6-tetramethyl]-1-piperidinyloxy, 4-hydroxy-2,2,6,6-tetramethylpiperidine-N-oxyl, bis(1-oxyl-2,2,6,6-tetramethylpiperidin-4-yl)sebacate, and decane diacid bis(2,2,6,6-tetramethyl-1-(octyloxy)-4-piperidinyl) ester.

Examples of commercially available products of a more preferable compound include ADK STAB LA-7 RD (manufactured by ADEKA) and IRGASTAB UV 10.

The hindered amine compounds may be used alone or in a combination of two or more thereof.

The content of the hindered amine compound is preferably in a range of 0.02 to 5% by mass, based on the total mass (100% by mass) of the ink composition. In particular, when the ink composition contains the compound having a 2,2,6,6-tetramethylpiperidinyl-N-oxyl radical, the content of this compound is preferably in a range of 0.05 to 3% by mass based on the total mass (100% by mass) of the ink composition, and more preferably 0.05 to 1% by mass. If the content of such a compound is within the above-specified range, satisfactory storage stability of an ink can be secured without deterioration of curability.

Polymerizable Compound Other than the Foregoing Compounds

As the polymerizable compound other than the foregoing compounds (hereinafter, referred to as "the other polymerizable compound"), a variety of conventional known monomers and oligomers, such as monofunctional, difunctional and trifunctional or higher polyfunctional monomers and oligomers, may be used. Examples of the monomer include unsaturated carboxylic acids, such as (meth)acrylic acid, itaconic acid, crotonic acid, isocrotonic acid and maleic acid, salts or esters thereof, urethane, amides and anhydrides thereof, acrylonitrile, styrene, various unsaturated polyesters, unsaturated polyether, unsaturated polyamide, and unsaturated urethane. Examples of the oligomer include oligomers formed from the foregoing monomers, such as a linear acrylic oligomer; epoxy(meth)acrylate, oxetane (meth)acrylate, aliphatic urethane(meth)acrylate, aromatic urethane(meth)acrylate and polyester(meth)acrylate.

As the other monofunctional monomer or polyfunctional monomer, an N-vinyl compound may be incorporated. Examples of the N-vinyl compound include N-vinyl formamide, N-vinyl carbazole, N-vinyl acetamide, N-vinyl pyrrolidone, N-vinylcaprolactam, and acryloylmorpholine, and derivatives thereof.

Among the other polymerizable compounds, an ester of (meth)acrylic acid, that is, (meth)acrylate is preferable.

Among the foregoing (meth)acrylates, examples of monofunctional (meth)acrylate include isoamyl(meth)acrylate, stearyl(meth)acrylate, lauryl(meth)acrylate, octyl(meth)acrylate, decyl(meth)acrylate, isomyristyl(meth)acrylate, isostearyl(meth)acrylate, 2-ethylhexyl-diglycol(meth)acrylate, 2-hydroxybutyl(meth)acrylate, butoxyethyl(meth)acrylate, ethoxydiethylene glycol(meth)acrylate, methoxydiethylene glycol(meth)acrylate, methoxypolyethylene glycol (meth)acrylate, methoxypropylene glycol(meth)acrylate, phenoxyethyl(meth)acrylate, tetrahydrofurfuryl(meth)acrylate, isobornyl(meth)acrylate, 2-hydroxyethyl(meth)acrylate, 2-hydroxypropyl(meth)acrylate, 2-hydroxy-3-phenoxypropyl(meth)acrylate, lactone-modified flexible (meth)acrylate, t-butylcyclohexyl(meth)acrylate, dicyclopentanyl (meth)acrylate, and dicyclopentenyloxyethyl(meth)acrylate.

Among the foregoing (meth)acrylates, examples of difunctional (meth)acrylate include triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethyloltricyclodecane di(meth)acrylate, EO (ethylene oxide) adduct di(meth)acrylate of bisphenol A, PO (propylene oxide) adduct di(meth)acrylate of bisphenol A, hydroxypivalic acid neopentyl glycol di(meth)acrylate, and polytetramethylene glycol di(meth)acrylate.

Among the foregoing (meth)acrylates, examples of trifunctional or higher polyfunctional (meth)acrylate include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

Among these, the other polymerizable compound preferably includes monofunctional (meth)acrylate. In this case, the ink composition becomes low in terms of viscosity, and therefore solubility of additives other than the photopolymerization initiator is excellent and ejection stability during ink jet recording is easily obtained. Further, from the viewpoint of increasing toughness, heat resistance and chemical resistance of a coating film, the use of monofunctional (meth)acrylate in combination with difunctional (meth)acrylate is more preferable.

The monofunctional (meth)acrylate preferably has one or more backbones selected from the group consisting of an aromatic ring backbone, a saturated cycloaliphatic ring backbone and an unsaturated cycloaliphatic ring backbone. When the other polymerizable compound is a monofunctional (meth)acrylate having the foregoing backbone, a viscosity of an ink composition can be decreased.

Examples of the monofunctional (meth)acrylate having an aromatic ring backbone include phenoxyethyl(meth)acrylate and 2-hydroxy-3-phenoxypropyl(meth)acrylate. Examples of the monofunctional (meth)acrylate having a saturated cycloaliphatic ring backbone include isobornyl(meth)acrylate, t-butylcyclohexyl(meth)acrylate and dicyclopentanyl (meth)acrylate. An example of the monofunctional (meth) acrylate having an unsaturated cycloaliphatic ring backbone may be dicyclopentenyloxyethyl(meth)acrylate.

Among these, at least one of phenoxyethyl(meth)acrylate and isobornyl(meth)acrylate is preferable and phenoxyethyl (meth)acrylate is more preferable, for the purpose of decreasing viscosity and malodor.

The content of the other polymerizable compound excluding the monomer A, the (meth)acrylated amine compound, and the hindered amine compound other than the (meth) acrylated amine compound is preferably in a range of 5 to 50% by mass, based on the total mass (100% by mass) of the ink composition. Particularly when the ink composition contains the phenoxyethyl(meth)acrylate, the content of the phenoxyethyl(meth)acrylate is preferably in a range 5 to 40% by mass based on the total mass (100% by mass) of the ink composition, more preferably 5 to 35% by mass, and particularly preferably 5 to 30% by mass. If the content of the phenoxyethyl(meth)acrylate is within the above-specified range, this leads to the reduction of viscosity and malodor while maintaining curability.

The other polymerizable compounds may be used alone or in a combination of two or more thereof.

Photopolymerization Initiator

The photopolymerization initiator incorporated in the ink composition of the present exemplary embodiment is used to cure an ink present on the surface of a recording medium to form printing, through photopolymerization by irradiation of ultraviolet radiation. Among radiation rays, the use of ultraviolet (UV) radiation is excellent in terms of safety and is capable of reducing costs of a light source lamp. Although there is no particular limitation on the polymerization initiator as long as it initiates polymerization of the foregoing polymerizable compound through the generation of active species, such as radicals or cationic groups, by energy of radiation (ultraviolet light), a photo-radical polymerization initiator or photo-cationic polymerization initiator may be used. Among these, a photo-radical polymerization initiator is preferably used.

Examples of the photo-radical polymerization initiator include aromatic ketones, acylphosphine oxide compounds, aromatic onium salt compounds, organic peroxides, thio compounds (such as thioxanthone compounds and thiophenyl group-containing compounds), hexaarylbiimidazole compounds, keto oxime ester compounds, borate compounds, adinium compounds, metallocene compounds, active ester compounds, compounds having a carbon-halogen bond, and alkylamine compounds.

Among these, particularly from the viewpoint of achieving satisfactory curability of an ink, at least one of an acylphosphine oxide compound and a thioxanthone compound is preferable, and an acylphosphine oxide compound and a thioxanthone compound are more preferable.

Specific examples of the photo-radical polymerization initiator include acetophenone, acetophenonebenzylketal, 1-hydroxycyclohexylphenylketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyldimethylketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholinopropan-1-one, bis(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-trimethylpentylphosphine oxide.

Examples of commercially available products of the photo-radical polymerization initiator include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methylpropionyl)-benzyl]phenyl]-2-methyl-propan-1-one), IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl) phenyl]-1-butanone), DAROCUR TPO (2,4,6-trimethylbenzoyl-diphenyl-phosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1,2-octanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), IRGACURE 754 (mixture of oxyphenylacetic acid, 2-[2-oxo-2-phenylacetoxyethoxy]ethylester, oxyphenylacetic acid, and 2-(2-hydroxyethoxy)ethylester) (all manufactured by Ciba Japan K.K.), KAYACURE DETX-S (2,4-diethylthioxanthone) (manufactured by Nippon Kayaku Co., Ltd.), Lucirin TPO, LR8893, LR8970 (all manufactured by BASF), and Ubecryl P36 (manufactured by UCB).

The foregoing photopolymerization initiators may be used alone or in a combination of two or more thereof.

For the purpose of sufficiently exhibiting an ultraviolet curing rate and avoiding dissolution residues of a photopolymerization initiator or coloration derived from a photopolymerization initiator, the content of the photopolymerization initiator is preferably in a range of 5 to 20% by mass based on the total mass (100% by mass) of the ink composition. Particularly, as described above, when the photopolymerization initiator incorporated in the ink composition is an acylphosphine oxide compound and a thioxanthone compound, the content of the acylphosphine oxide compound is preferably 7% by mass or more based on the total mass (100% by mass) of the ink composition, and more preferably in a range of 7 to 15% by mass. Further, the content of the thioxanthone compound is preferably 0.5% by mass or more based on the total mass (100% by mass) of the ink composition, and more preferably in a range of 0.5 to 5% by mass. In this case, particularly satisfactory curability of an ink may be achieved.

Although addition of a photopolymerization initiator may be omitted by the use of a photopolymerizable compound as the polymerizable compound, the use of a photopolymerization initiator is preferable from the viewpoint of easy control of the initiation of polymerization.

Color Material

The ink composition of the present exemplary embodiment may further contain a color material. The color material may be at least one of a pigment and a dye.

Pigment

In the present exemplary embodiment, the use of a pigment as a color material may improve lightfastness of an ink composition. Both of an inorganic pigment and an organic pigment may be used as the pigment.

Examples of the inorganic pigment include carbon black (C.I. Pigment Black 7) such as furnace black, lamp black, acetylene black or channel black, iron oxide, and titanium oxide.

Examples of the organic pigment include azo pigments such as an insoluble azo pigment, a condensed azo pigment, an azo lake pigment, and a chelate azo pigment; polycyclic pigments such as a phthalocyanine pigment, a perylene pigment, a perinone pigment, an anthraquinone pigment, a quinacridone pigment, a dioxane pigment, a thioindigo pigment, an isoindolinone pigment and a quinophthalone pigment; a dye chelate (for example, basic dye chelate and acidic dye chelate), a dye lake (basic dye lake, acidic dye lake), a nitro pigment, a nitroso pigment, aniline black and a daylight fluorescent pigment.

More specifically, examples of carbon black used as a black ink include No. 2300, No. 900, MCF88, No. 33, No. 40, No. 45, No. 52, MA7, MA8, MA100, No. 2200 B or the like (all manufactured by Mitsubishi Chemical Corporation), Raven 5750, Raven 5250, Raven 5000, Raven 3500, Raven 1255, Raven 700 or the like (all manufactured by Carbon Columbia), Regal 400 R, Regal 330 R, Regal 660 R, Mogul L, Monarch 700, Monarch 800, Monarch 880, Monarch 900, Monarch 1000, Monarch 1100, Monarch 1300, Monarch 1400 or the like (all manufactured by Cabot Japan K.K.), Color Black FW1, Color Black FW2, Color Black FW2V, Color Black FW18, Color Black FW200, Color Black 5150, Color Black S160, Color Black S170, Printex 35, Printex U, Printex V, Printex 140U, Special Black 6, Special Black 5, Special Black 4A, Special Black 4 or the like (all manufactured by Degussa).

Examples of the pigment used in a white ink include C.I. Pigment White 6, 18, 21.

Examples of the pigment used in a yellow ink include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, and C.I. Pigment Yellow 180.

Examples of the pigment used in a magenta ink include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48 (Ca), C.I. Pigment Red 48 (Mn), C.I. Pigment Red 57 (Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, or C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of the pigment used in a cyan ink include C.I. Pigment Blue 1, C.I. Pigment Blue 2, C.I. Pigment Blue 3, C.I. Pigment Blue 15, C.I. Pigment Blue 15:1, C.I. Pigment Blue 15:2, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of pigments other than the magenta, cyan and yellow pigments include C.I. Pigment Green 7, C.I. Pigment Green 10, C.I. Pigment Brown 3, C.I. Pigment Brown 5, C.I. Pigment Brown 25, C.I. Pigment Brown 26, C.I. Pigment Orange 1, C.I. Pigment Orange 2, C.I. Pigment Orange 5, C.I. Pigment Orange 7, C.I. Pigment Orange 13, C.I. Pigment Orange 14, C.I. Pigment Orange 15, C.I. Pigment Orange 16, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 63.

These pigments may be used alone or in a combination of two or more thereof.

When the foregoing pigment is used, the average particle diameter of the pigment is preferably 300 nm or less, and more preferably in a range of 50 to 200 nm. If the average particle diameter of the pigment is within the above-specified range, an ink composition is superior in terms of reliability such as ejection stability or dispersion stability, in conjunction with the formation of an image with excellent image quality. Here, the average particle diameter of the pigment in the present specification is measured by a dynamic light scattering method.

Dye

In the present exemplary embodiment, a dye may be used as a color material. There is no particular limitation on the dye. An acidic dye, a direct dye, a reactive dye, or a basic dye may be used. Examples of the dye include C.I. Acid Yellow 17, 23, 42, 44, 79, 142, C.I. Acid Red 52, 80, 82, 249, 254, 289, C.I. Acid Blue 9, 45, 249, C.I. Acid Black 1, 2, 24, 94, C.I. Food Black 1, 2, C.I. Direct Yellow 1, 12, 24, 33, 50, 55, 58, 86, 132, 142, 144, 173, C.I. Direct Red 1, 4, 9, 80, 81, 225, 227, C.I. Direct Blue 1, 2, 15, 71, 86, 87, 98, 165, 199, 202, C.I. Direct Black 19, 38, 51, 71, 154, 168, 171, 195, C.I. Reactive Red 14, 32, 55, 79, 249, and C.I. Reactive Black 3, 4, 35.

These dyes may be used alone or in a combination of two or more thereof.

The content of the color material is preferably in a range of 1 to 20% by mass based on the total mass of the ink composition, from the viewpoint of excellent masking property and color reproducibility.

Dispersant

When the ink composition of the present exemplary embodiment contains a pigment, the ink composition may further contain a dispersant, from the viewpoint of superior pigment dispersibility. Although there is no particular limitation on the dispersant, for example, mention may be made of a dispersant commonly used in the preparation of a dispersion of a pigment such as a high-molecular weight dispersant. Specific examples of such a dispersant include those containing, as a main component, at least one of polyoxyalkylene polyalkylene polyamine, a vinyl polymer or copolymer, an acrylic polymer or copolymer, polyester, polyamide, polyimide, polyurethane, an amino polymer, a silicon-containing polymer, a sulfur-containing polymer, a fluorine-containing polymer, and an epoxy resin. Examples of commercially available products of the high-molecular weight dispersant include Ajisper series (manufactured by Ajinomoto Fine-Techno Co., Inc.), Solsperse series such as Solsperse 36000 (available from Avecia Co.), Disperbyk series (manufactured by BYK Chemie), and Disparlon series (manufactured by Kusumoto Chemicals, Ltd.).

Slip Agent

The ink composition of the present exemplary embodiment may further contain a slip agent (surfactant), from the viewpoint of obtaining high scratch resistance. There is no particular limitation on the slip agent. For example, polyester-modified silicone or polyether-modified silicone may be used as a silicone surfactant. Polyether-modified polydimethylsiloxane or polyester-modified polydimethylsiloxane is particularly preferably used. Specific examples thereof include BYK-347, BYK-348, BYK-UV3500, 3510, 3530, and 3570 (manufactured by BYK Japan KK).

Other Additives

The ink composition of the present exemplary embodiment may contain additives (components) other than the foregoing additives. There is no particular limitation on these components. For example, there may be used conventional known polymerization accelerators, penetration accelerators, and wetting agents (humectants), and other additives. Examples of the other additives include a fixing agent, an anti-mold agent, a preservative, an antioxidant, an ultraviolet absorbent, a chelating agent, a pH adjuster, and a thickening agent, which are conventionally known in the art.

Recording Medium

The ultraviolet-curable ink jet ink composition of the present exemplary embodiment is capable of obtaining a record by ejecting the composition on a recording medium, in accordance with an ink jet recording method to be described hereinafter. The recording medium may be, for example, an absorptive or non-absorptive recording medium. The ink jet recording method of the present exemplary embodiment is broadly applicable to recording media having a variety of absorptive performances, ranging from a non-absorptive recording medium in which the penetration of a water-soluble ink composition is difficult to an absorptive recording medium in which the penetration of a water-soluble ink composition is easy. When the present ink composition is applied to a non-absorptive recording medium, it may be necessary to provide a drying step or the like after curing of the composition by UV irradiation.

There is no particular limitation on the absorptive recording medium. For example, mention may be made of plain paper, such as electrophotographic paper, exhibiting high penetrability of a water-based ink, ink jet paper (paper used exclusively for ink jet recording, having an ink absorptive layer formed of silica particles or alumina particles, or an ink absorptive layer formed of a hydrophilic polymer such as polyvinyl alcohol (PVA) or polyvinylpyrrolidone (PVP)), and art paper, coated paper, cast paper and the like which exhibit relative low penetrability of a water-based ink and are used in common offset printing.

There is no particular limitation on the non-absorptive recording medium. For example, mention may be made of a film or plate of plastics such as polyvinyl chloride, polyethylene, polypropylene or polyethylene terephthalate (PET), a plate of metals such as iron, silver, copper or aluminum, or a metal plate or plastic film prepared by vapor deposition of these various metals, a plate of alloy of stainless steel or cast brass, and the like.

Ink Jet Recording Method

The ultraviolet-curable ink jet ink composition of the present exemplary embodiment may adopt an ink jet recording method. The ink jet recording method includes an ejection step of ejecting the ink composition on a recording medium, and a curing step of curing the ink composition by irradiating ultraviolet radiation on the ink composition ejected by the ejection step. In this manner, a coating film (cured film) is formed by the ink composition cured on a recording medium.

Ejection Step

In the ejection step, a conventional known ink jet recording apparatus may be used. When an ink composition is ejected, the viscosity of the ink composition is preferably 25 mPa·s or less, and more preferably in a range of 5 to 20 mPa·s. If the viscosity of the ink composition is within the above-specified range in a state where the temperature of the ink composition is room temperature or the ink composition is not heated, the ink composition may be ejected in a state where the temperature of the ink composition is room temperature or without heating of the ink composition. Alternatively, an ink composition may be ejected by heating the ink composition to a given temperature such that a preferable viscosity is obtained. In this manner, a satisfactory ejection stability is realized.

The radiation-curable ink composition of the present exemplary embodiment has a viscosity higher than that of an aqueous ink composition used as a conventional ink jet recording ink, and therefore exhibits a significant change in viscosity in response to a change in temperature upon ejection. Such a change in viscosity of an ink has a significant effect on changes in droplet size and changes in droplet ejection rate, and may result in image degradation. Accordingly, it is preferable that the temperature of an ink upon ejection thereof is maintained as constant as possible.

Curing Step

Next, in the curing step, the ink composition ejected on a recording medium is cured by irradiation of ultraviolet radiation (light). This is because the photopolymerization initiator incorporated in the ink composition is degraded by irradiation of ultraviolet radiation and generates initiation species such as radicals, acid and base, and a polymerization reaction of a photopolymerizable compound is accelerated by the function of those initiation species. Alternatively, this is because a polymerization reaction of a photopolymerizable compound is initiated by irradiation of ultraviolet radiation. At this time, if a sensitizing dye is present in combination with a photopolymerization initiator in an ink composition, the sensitizing dye in the system absorbs active radiation to become an excited state, and therefore contact of the sensitizing dye with the photopolymerization initiator accelerates the degradation of the photopolymerization initiator, thus achieving a curing reaction with higher sensitivity.

As for the ultraviolet radiation source, a mercury lamp, a gas/solid laser and the like are principally utilized and for curing of an ultraviolet-curable ink jet ink composition, a mercury lamp and a metal halide lamp are widely known. Further, since there is currently a strong need for being mercury-free in view of environmental protection, replacement by a GaN-based semiconductor ultraviolet-emitting device is industrially and environmentally very useful. In addition, an ultraviolet light emitting diode (UV-LED) and an ultraviolet laser diode (UV-LD) are compact, long-lived, highly efficient and inexpensive and are promising as a light source for an ultraviolet-curable ink jet. Among these, an UV-LED is preferable.

Here, it is preferable to use an ultraviolet-curable ink jet ink composition which is curable by irradiation of ultraviolet radiation having an emission peak wavelength preferably in a range of 350 to 420 nm and more preferably 365 to 405 nm, at an irradiation energy preferably of 300 mJ/cm$^2$ or less and more preferably 100 to 250 mJ/cm$^2$. In this case, low energy also enables high-speed curing, due to the constitutional composition of the ink composition according to the present exemplary embodiment. Irradiation energy is calculated by multiplying the irradiation time by the irradiation intensity. The irradiation time can be reduced by the constitutional composition of the ink composition according to the present exemplary embodiment, and in this case, a printing speed is increased. On the other hand, the irradiation intensity can be reduced by the constitutional composition of the ink composition according to the present exemplary embodiment, and in this case, miniaturization of an apparatus or reduction of costs is realized. As for irradiation of ultraviolet radiation at that time, an UV-LED is preferably used. Such an ink composition is obtained by incorporating a photopolymerization initiator which is degraded by irradiation of ultraviolet radiation having the above-specified wavelength range, and/or a polymerizable compound which initiates the polymerization thereof by irradiation of ultraviolet radiation having the above-specified wavelength range. Further, the emission peak wavelength may be singular or plural within the above-specified wavelength range. Even when the emission peak wavelength is plural, the total irradiation energy of ultraviolet radiation having the above-specified emission peak wavelength is taken as the above-specified irradiation energy.

Further, it is preferable to use an ultraviolet-curable ink jet ink composition which is curable to a thin film with a thickness of preferably 0.5 to 3 μm and more preferably 0.8 to 2.5 μm. In this case, the formation of an image as a thin film becomes possible due to the constitutional composition of the ink composition according to the present exemplary embodiment, and therefore embossment of a coating film is advantageously decreased. Such an ink composition can be obtained by the above-mentioned various methods.

As such, the present exemplary embodiment is capable of providing an ultraviolet-curable ink jet ink composition which is excellent in terms of curability and storage stability.

EXAMPLES

Hereinafter, exemplary embodiments of the invention will be described in more detail with reference to Examples and Comparative Examples, but the present exemplary embodiments are not limited to these Examples.

Components Used

Components used in the following Examples and Comparative Examples are as follows.

Monomer A
2-(2-vinyloxyethoxy)ethyl acrylate (trade name: VEEA, manufactured by Nippon Shokubai Co., Ltd., abbreviated as VEEA in Table 1 and Table 2)

Acrylated Amine Compound
CN371 (trade name, manufactured by Sartomer Co.)
EBECRYL 7100 (trade name, manufactured by Daicel-Cytec Company Ltd.)
CN386 (trade name, manufactured by Sartomer Co.)
CN373 (trade name, manufactured by Sartomer Co.)

Hindered Amine Compound
IRGASTAB UV10 (trade name, manufactured by Ciba Japan K.K., abbreviated as UV10 in Table 1 and Table 2)
ADK STAB LA-7 RD (trade name, manufactured by ADEKA, abbreviated as LA-7 RD in Table 1 and Table 2)
FA-712HM (trade name, manufactured by Hitachi Chemical Company, Ltd.)

Polymerizable Compounds Other than Foregoing Compounds
Phenoxyethyl acrylate Viscoat #192 (trade name, manufactured by Osaka Organic Chemical Industry Ltd., abbreviated as PEA in Table 1 and Table 2)
N-Vinylcaprolactam (trade name: V-CAP, manufactured by ISP Japan Ltd., abbreviated as NVC in Table 1 and Table 2)
Isobornyl acrylate IBXA (trade name, manufactured by Osaka Organic Chemical Industry Ltd., abbreviated as IBXA in Table 1 and Table 2)
Dimethyloltricyclodecane diacrylate (trade name: A-DPC, manufactured by Shin-Nakamura Chemical Co., Ltd., abbreviated as DMTCDDA in Table 1 and Table 2)
Pentaerythritol triacrylate (trade name: A-TMM-3LM-N, manufactured by Shin-Nakamura Chemical Co., Ltd., abbreviated as PETIA in Table 1 and Table 2)

Photopolymerization Initiator
IRGACURE 819 (trade name, manufactured by Ciba Japan K.K., solid content: 100%, abbreviated as 819 in Table 1 and Table 2)
DAROCURE TPO (trade name, manufactured by Ciba Japan K.K., solid content: 100%, abbreviated as TPO in Table 1 and Table 2)
KAYACURE DETX-S (trade name, manufactured by Nippon Kayaku Co., Ltd., solid content: 100%, abbreviated as DETX-S in Table 1 and Table 2)

Slip Agent
Silicone-based surface modifier BYK-UV3500 (trade name, manufactured by BYK, abbreviated as UV3500 in Table 1 and Table 2)

Pigment
IRGALITE BLUE GLVO (trade name, color index name: Pigment Blue 15:4, manufactured by BASF, abbreviated as BLUE GLVO in Table 1 and Table 2)

Dispersant
Solsperse 36000 (trade name, manufactured by LUBRIZOL, abbreviated as SOL36000 in Table 1 and Table 2)

Examples 1 to 25 and Comparative Examples 1 to 3

Components given in the following Table 1, Table 2, and Table 3 were respectively added to make the composition formulas (unit: % by mass) given in Table 1, Table 2 and Table 3, followed by stirring with a high-speed water-cooling stirrer to obtain cyan-color ultraviolet-curable ink jet ink compositions. Blanks in Table 1, Table 2 and Table 3 mean no addition of components.

Evaluation Item

1. Curability

The foregoing light-curable ink compositions were filled into each nozzle array by using an ink jet printer PX-G5000 (trade name, manufactured by Seiko Epson Corporation). Solid pattern images (recording resolution: 720×720 dpi) having a middle-sized diameter of ink dots and a 2 μm coating thickness of a printed matter were printed on PET films (trade name: Lumiroir 125 E20, manufactured by Panac Co., Ltd.) under normal temperature and normal pressure. The solid pattern images were cured by irradiating 200 mJ/cm² of ultraviolet radiation having a wavelength of 395 nm at an irradiation intensity of 60 mW/cm² from UV-LEDs in ultraviolet irradiation apparatuses mounted on the sides of the carriage. In this manner, recorded matters were prepared which had solid pattern images printed on PET films. The solid pattern image is an image that has recorded the dot for every pixel of a pixel which is a minimum recording unit region defined by a recording resolution.

The irradiation energy [mJ/cm²] was calculated by measuring an irradiation intensity [mW/cm²] on an irradiation surface irradiated by a light source, and then multiplying the calculated irradiation intensity of the irradiation surface by an irradiation duration [s]. The measurement of irradiation intensity was carried out using an ultraviolet intensitometer UM-10 and a Receptor Head UM-400 (both manufactured by Konica Minolta Sensing, Inc.).

Whether or not it was tack-free was decided under the following conditions. That is, decision was made based on whether or not an ink adhered to a cotton swab, or whether or not scratches occurred on the cured matter of an ink on a recording medium. At that time, the cotton swab used was a Johnson cotton swab (manufactured by Johnson & Johnson Company). The number of rubbing times was 10 times in forward and backward movement, and a rubbing intensity was a load of 100 g.

In addition, the thickness of an ink coating film (cured film) upon performing curability evaluation was set to 2 μm. Evaluation criteria were as follows. In the evaluation criteria, ⊙ and ○ are criteria which are acceptable in terms of practical application. The evaluation results are given in Table 4, Table 5 and Table 6 below.

⊙: irradiation energy of 200 mJ/cm² or less when it is tack-free

○: irradiation energy of higher than 200 mJ/cm² and 300 mJ/cm² or less when it is tack-free Δ: irradiation energy of higher than 300 mJ/cm² and 400 mJ/cm² or less when it is tack-free X: irradiation energy of higher than 400 mJ/cm² when it is tack-free 2. Storage Stability The ink compositions were allowed to stand under the environment of 60° C. for 7 days, and an initial viscosity (mPa·s) and a viscosity after being allowed to stand (mPa·s) were measured using a rheometer (trade name: MCR-300, manufactured by Physica). % change in viscosity was evaluated according to the following criteria. In the evaluation criteria, A, B, and C are criteria which are acceptable in terms of practical application. The evaluation results are given in Table 4, Table 5, and Table 6 below.

A: % change in viscosity before and after storage at 60° C. for 7 days, Δη of less than 5%

B: % change in viscosity before and after storage at 60° C. for 7 days, Δη of 5% or more and less than 10%

C: % change in viscosity before and after storage at 60° C. for 7 days, Δη of 10% or more and less than 15%

D: % change in viscosity before and after storage at 60° C. for 7 days, Δη of 15% or more and less than 20%

E: % change in viscosity before and after storage at 60° C. for 7 days, Δη of 20% or more

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Monomer A | VEEA | 40.00 | 50.00 | 80.00 | 82.00 | 65.00 | 65.00 | 50.00 | 50.00 | 50.00 | 65.00 |
| Acrylated amine | CN371 | 5.00 | 5.00 | | | | | | | | 5.00 |
| | EBECRYL7100 | | | 1.60 | 1.60 | 0.20 | 0.50 | 30.00 | 36.00 | | |
| | CN386 | | | | | | | | | 30.00 | |
| Polymerizable compounds other than the foregoing compounds | PEA | 20.00 | 10.00 | 5.00 | 5.00 | 15.00 | 15.00 | 5.00 | 5.00 | 5.00 | 10.00 |
| | NVC | 6.00 | 6.00 | | | 5.00 | 5.00 | | | | 5.00 |
| | IBXA | | | | | | | | | | |
| | DMTCDDA | 10.00 | 10.00 | | | 3.40 | 3.10 | | | | |
| | PETIA | 10.00 | 10.00 | 2.00 | | | | 6.00 | | 6.00 | 3.60 |
| Photopolymerization initiator | 819 | 4.00 | 4.00 | 4.00 | 4.00 | 4.00 | 4.00 | 4.00 | 4.00 | 4.00 | 4.00 |
| | TPO | 3.00 | 3.00 | 3.00 | 3.00 | 3.00 | 3.00 | 3.00 | 3.00 | 3.00 | 3.00 |
| | DETX-S | 1.00 | 1.00 | 1.00 | 1.00 | 1.00 | 1.00 | 1.00 | 1.00 | 1.00 | 1.00 |
| Hindered amine compound | FA-712HM | | | | | | | | | | 0.80 |
| | UV 10 | 0.80 | 0.80 | 0.80 | 0.80 | | | | | | |
| | LA-7RD | | | | | 0.80 | 0.80 | 0.80 | 0.80 | 0.80 | |
| Slip agent | UV3500 | 0.20 | 0.20 | 0.20 | 0.20 | 0.20 | 0.20 | 0.20 | 0.20 | 0.20 | 0.20 |
| Pigment | BLUE GLVO | | | 1.60 | 1.60 | 1.60 | 1.60 | | | | 1.60 |
| Dispersant | Solsperse36000 | | | 0.80 | 0.80 | 0.80 | 0.80 | | | | 0.80 |
| Total | | 100 | 100 | 100 | 100 | 100 | 100 | 100 | 100 | 100 | 100 |

TABLE 2

|  |  | Example 11 | Example 12 | Example 13 | Example 14 | Example 15 | Example 16 | Example 17 | Example 18 |
|---|---|---|---|---|---|---|---|---|---|
| Monomer A | VEEA | 65.00 | 65.00 | 65.00 | 65.00 | 65.00 | 65.00 | 55.00 | 50.00 |
| Acrylated amine | CN371 | 5.00 | 5.00 | 5.00 | 5.00 | 5.00 | 5.00 | 1.50 | 1.50 |
|  | EBECRYL7100 |  |  |  |  |  |  |  |  |
|  | CN386 |  |  |  |  |  |  |  |  |
| Polymerizable | PEA | 10.78 | 10.75 | 7.80 | 5.80 | 2.00 | 5.00 | 35.00 | 40.00 |
| compounds other | NVC | 5.00 | 5.00 | 5.00 | 5.00 | 5.00 | 5.00 |  |  |
| than the foregoing | IBXA |  |  |  |  | 4.60 | 1.60 |  |  |
| compounds | DMTCDDA |  |  |  |  | 2.50 | 2.50 |  |  |
|  | PETIA | 3.60 | 3.60 | 3.60 | 3.60 | 5.00 | 5.00 |  |  |
| Photopolymerization | 819 | 4.00 | 4.00 | 4.00 | 4.00 | 4.00 | 4.00 | 4.00 | 4.00 |
| initiator | TPO | 3.00 | 3.00 | 3.00 | 3.00 | 3.00 | 3.00 | 3.00 | 3.00 |
|  | DETX-S | 1.00 | 1.00 | 1.00 | 1.00 | 0.50 | 0.50 | 0.50 | 0.50 |
| Hindered amine | FA-712HM |  |  |  |  |  |  |  |  |
| compound | UV 10 | 0.02 | 0.05 | 3.00 | 5.00 | 0.80 | 0.80 | 0.80 | 0.80 |
|  | LA-7RD |  |  |  |  |  |  |  |  |
| Slip agent | UV3500 | 0.20 | 0.20 | 0.20 | 0.20 | 0.20 | 0.20 | 0.20 | 0.20 |
| Pigment | BLUE GLVO | 1.60 | 1.60 | 1.60 | 1.60 | 1.60 |  |  |  |
| Dispersant | Solsperse36000 | 0.80 | 0.80 | 0.80 | 0.80 | 0.80 |  |  |  |
|  | Total | 100 | 100 | 100 | 100 | 100 | 100 | 100 | 100 |

TABLE 3

|  |  | Example 19 | Example 20 | Example 21 | Example 22 | Example 23 | Example 24 | Example 25 | Comparative Example 1 | Comparative Example 2 | Comparative Example 3 |
|---|---|---|---|---|---|---|---|---|---|---|---|
| Monomer A | VEEA | 65.00 | 65.00 | 50.00 | 50.00 | 65.00 | 65.00 | 10.00 |  | 50.00 | 50.00 |
| Acrylated amine | CN371 | 5.00 | 5.00 | 30.00 |  | 5.00 | 5.00 | 5.00 |  |  |  |
|  | EBECRYL7100 |  |  |  |  |  |  |  | 7.50 |  | 7.50 |
|  | CN386 |  |  |  | 30.00 |  |  |  |  |  |  |
| Polymerizable | PEA |  | 10.00 | 5.00 | 5.00 | 10.00 | 10.00 | 40.00 | 7.50 | 20.00 | 20.00 |
| compounds other | NVC | 5.00 | 5.00 |  |  | 5.00 | 5.00 | 6.00 |  | 5.00 | 5.00 |
| than the foregoing | IBXA | 6.60 |  |  |  |  |  | 15.00 | 50.00 | 11.10 | 4.40 |
| compounds | DMTCDDA | 2.50 |  |  |  |  |  |  | 5.00 |  |  |
|  | PETIA | 5.00 | 3.80 | 6.00 | 6.00 | 3.60 | 3.60 | 15.00 | 20.00 | 2.50 | 2.50 |
| Photopolymerization | 819 | 4.00 | 4.00 | 4.00 | 4.00 | 4.00 | 4.00 | 4.00 | 3.60 | 4.00 | 4.00 |
| initiator | TPO | 3.00 | 3.00 | 3.00 | 3.00 | 3.00 | 3.00 | 3.00 | 2.50 | 3.00 | 3.00 |
|  | DETX-S | 0.50 | 1.00 | 1.00 | 1.00 | 1.00 | 1.00 | 1.00 | 4.00 | 1.00 | 1.00 |
| Hindered amine | FA-712HM |  |  |  |  |  |  |  | 3.00 |  |  |
| compound | UV 10 | 0.80 | 0.80 |  |  | 0.80 |  | 0.80 | 1.00 | 0.80 |  |
|  | LA-7RD |  |  | 0.80 | 0.80 |  | 0.80 |  |  |  |  |
| Slip agent | UV3500 | 0.20 |  | 0.20 | 0.20 | 0.20 | 0.20 | 0.20 | 0.80 | 0.20 | 0.20 |
| Pigment | BLUE GLVO | 1.60 | 1.60 |  |  | 1.60 | 1.60 |  |  | 1.60 | 1.60 |
| Dispersant | Solsperse36000 | 0.80 | 0.80 |  |  | 0.80 | 0.80 |  | 0.20 | 0.80 | 0.80 |
|  | Total | 100 | 100 | 100 | 100 | 100 | 100 | 100 | 100 | 100 | 100 |

TABLE 4

| Evaluation test | Example 1 | Example 2 | Example 3 | Example 4 | Example 5 | Example 6 | Example 7 | Example 8 | Example 9 | Example 10 |
|---|---|---|---|---|---|---|---|---|---|---|
| Curability | ○ | ◎ | ◎ | ○ | ○ | ◎ | ◎ | ◎ | ○ | ◎ |
| Storability | A | A | A | B | A | A | A | B | C | C |

TABLE 5

| Evaluation test | Example 11 | Example 12 | Example 13 | Example 14 | Example 15 | Example 16 | Example 17 | Example 18 |
|---|---|---|---|---|---|---|---|---|
| Curability | ◎ | ◎ | ◎ | ○ | ○ | ◎ | ◎ | ○ |
| Storability | B | A | A | B | A | A | A | A |

TABLE 6

| Evaluation test | Example 19 | Example 20 | Example 21 | Example 22 | Example 23 | Example 24 | Example 25 | Comparative Example 1 | Comparative Example 2 | Comparative Example 3 |
|---|---|---|---|---|---|---|---|---|---|---|
| Curability | ◎ | ◎ | ◎ | ○ | ◎ | ◎ | ○ | X | X | ○ |
| Storability | A | A | A | C | A | A | A | B | B | E |

As can be seen from Table 4, Table 5 and Table 6 above, it was found that the ultraviolet-curable ink jet ink composition containing a certain monomer A, an acrylated amine compound, and a hindered amine compound other than the acrylated amine compound is satisfactory in terms of both curability and storage stability (storability).

Example 21 is an example with substitution of an acrylated amine, as compared to Examples 7 and 9. Since Example 21 used CN 371 (two amino groups and two acrylic groups), it was found that Example 21 exhibited satisfactory results as in Example 7 using EBECRYL 7100. Example 22 is an example with substitution of an acrylated amine, as compared to Examples 7, 9 and 21. It was found from this comparison that the Example using CN 373 (one amino group and two acrylic groups) was inferior to the Example using EBECRYL 7100 or CN 371. Examples 23 and 24 are examples with substitution of a hindered amine compound, as compared to Example 10. It was found that all of Example 23 using UV10 and Examples using LA-7RD exhibited satisfactory results.

What is claimed is:

1. An ultraviolet-curable ink jet ink composition comprising:
    a monomer A represented by Formula (I):

$$CH_2=CR^1-COOR^2-O-CH=CH-R^3 \quad (I)$$

(wherein $R^1$ represents a hydrogen atom or a methyl group, $R^2$ represents a $C_2$-$C_{20}$ divalent organic residue, and $R^3$ represents a hydrogen atom or a $C_1$-$C_{11}$ monovalent organic residue);
    a (meth)acrylated amine compound;
    a hindered amine compound other than the (meth)acrylated amine compound, the hindered amine compound being a compound having a structure of a 2,2,6,6-tetramethylpiperidinyl-N-oxyl radical; and
    a photopolymerization initiator.

2. The ultraviolet-curable ink jet ink composition according to claim 1, wherein the monomer A is 2-(vinyloxyethoxy) ethyl (meth)acrylate.

3. The ultraviolet-curable ink jet ink composition according to claim 1, wherein the content of the monomer A is in the range of 10 to 80% by mass, based on the total mass of the ink composition.

4. The ultraviolet-curable ink jet ink composition according to claim 1, wherein the (meth)acrylated amine compound has one or two photopolymerizable functional groups and one or two amino groups in the molecule thereof.

5. The ultraviolet-curable ink jet ink composition according to claim 1, wherein the content of the (meth)acrylated amine compound is in the range of 0.5 to 30% by mass, based on the total mass of the ink composition.

6. The ultraviolet-curable ink jet ink composition according to claim 1, wherein the content of the compound having a 2,2,6,6-tetramethylpiperidinyl-N-oxyl radical is in the range of 0.05 to 3% by mass, based on the total mass of the ink composition.

7. The ultraviolet-curable ink jet ink composition according to claim 1, further comprising 5 to 40% by mass of phenoxyethyl(meth)acrylate, based on the total mass of the ink composition.

8. The ultraviolet-curable ink jet ink composition according to claim 1, wherein the ultraviolet-curable ink jet ink composition is curable by irradiating ultraviolet radiation with an emission peak wavelength ranging from 350 to 420 nm, at an irradiation energy of 300 mJ/cm² or less.

9. The ultraviolet-curable ink jet ink composition according to claim 1, wherein the ultraviolet-curable ink jet ink composition is curable to a thin film having a thickness of 0.5 to 3 μm.

10. The ultraviolet-curable ink jet ink composition according to claim 1, wherein that the hindered amine includes either 2,2,6,6-tetramethyl-4-hydroxypiperidine-1-oxyl or 4,4'-[1,10-dioxo-1,10-decanediyl)bis(oxy)]bis[2,2,6,6-tetramethyl]-1-piperidinyloxy.

* * * * *